United States Patent [19]
Ingleton

[11] Patent Number: 5,459,612
[45] Date of Patent: Oct. 17, 1995

[54] DISPLAY SYSTEM

[75] Inventor: Martin Ingleton, Sheerness, England

[73] Assignee: GEC-Marconi Limited, United Kingdom

[21] Appl. No.: 101,845

[22] Filed: Aug. 4, 1993

[30] Foreign Application Priority Data

Aug. 12, 1992 [GB] United Kingdom ............ 9217058

[51] Int. Cl.⁶ .................................................. G02B 27/14
[52] U.S. Cl. .................. 359/630; 359/631; 359/632; 359/633; 359/637; 359/639; 359/640
[58] Field of Search ................................ 359/630–633, 359/637–640

[56] References Cited

U.S. PATENT DOCUMENTS

| 4,081,209 | 3/1978 | Heller et al. | 359/631 |
| 4,361,384 | 11/1982 | Bosserman | 359/630 |
| 5,249,081 | 9/1993 | Rogers | 359/633 |

FOREIGN PATENT DOCUMENTS

| 0077193 | 4/1983 | European Pat. Off. . |
| 0366467 | 5/1990 | European Pat. Off. . |
| 0380035 | 8/1990 | European Pat. Off. . |
| 2412083 | 1/1975 | Germany . |
| 1264343 | 2/1972 | United Kingdom . |
| 1335360 | 10/1973 | United Kingdom . |
| 1489323 | 10/1977 | United Kingdom . |
| 1533859 | 11/1978 | United Kingdom . |
| 2006463 | 5/1979 | United Kingdom . |
| 2100466 | 12/1982 | United Kingdom . |
| 2108702 | 5/1983 | United Kingdom . |
| 2144558 | 3/1985 | United Kingdom . |

*Primary Examiner*—Scott J. Sugarman
*Assistant Examiner*—Michael A. Papalas
*Attorney, Agent, or Firm*—Kirschstein et al.

[57] ABSTRACT

A helmet mounted display system comprising an eyepiece (3) through which a wearer of the helmet directly views a forward scene (13). The eyepiece also serves to combine an intensified image of the forward scene with the wearer's direct view of the scene. The intensified image is produced by an optical arrangement including an image intensifier (6) from which light is passed to the eyepiece via a prism (2). The prism serves to compensate for orientation of the intensified image in other parts of the optical arrangement so that the intensified image is in the same orientation as the wearer's direct view of the forward scene. In addition the prism allows the various components in the system light path to conform to the profile of the helmet thereby making the helmet more comfortable for a wearer.

6 Claims, 3 Drawing Sheets

DISPLAY SYSTEM

BACKGROUND OF THE INVENTION

1. Field of the Invention

This invention relates to a display system, more particularly, to a helmet mounted display system of the kind which provides a wearer of the helmet with a direct view of a scene forward of the helmet wearer on which is superimposed an intensified image of said scene, e.g. for night vision.

In such a system it is desirable for the components of the system to be relatively positioned so as to distribute the weight of the system around the helmet in a balanced manner, and thereby make the helmet comfortable in use for the wearer. This is difficult to achieve whilst at the same time obtaining an intensified image of the forward scene which is in the same orientation as the wearer's direct view of the forward scene. Known arrangements typically use a so-called Peckham prism which has five internal faces at which reflection of light takes place, and consequently is bulky and has an inconveniently long equivalent length.

SUMMARY OF THE INVENTION

It is an object of the present invention to provide a display system when the attainment of these two requirements is facilitated.

According to the present invention there is provided a helmet mounted display system comprising: an eyepiece through which a wearer of the helmet can directly view a forward scene and which also serves to combine an intensified image of the forward scene with the wearer's direct view of said scene, characterised in that the intensified image is produced by an optical arrangement providing a light path substantially conforming to the profile of the helmet and incorporating prism means which serves to compensate for orientation of the intensified image in other parts of the optical arrangement.

BRIEF DESCRIPTION OF THE DRAWING

In order that the invention may be fully understood, one example of a display system in accordance therewith will now be described with reference to the accompanying drawings in which.

DETAILED DESCRIPTION OF THE PREFERRED EMBODIMENTS

Figure 5:
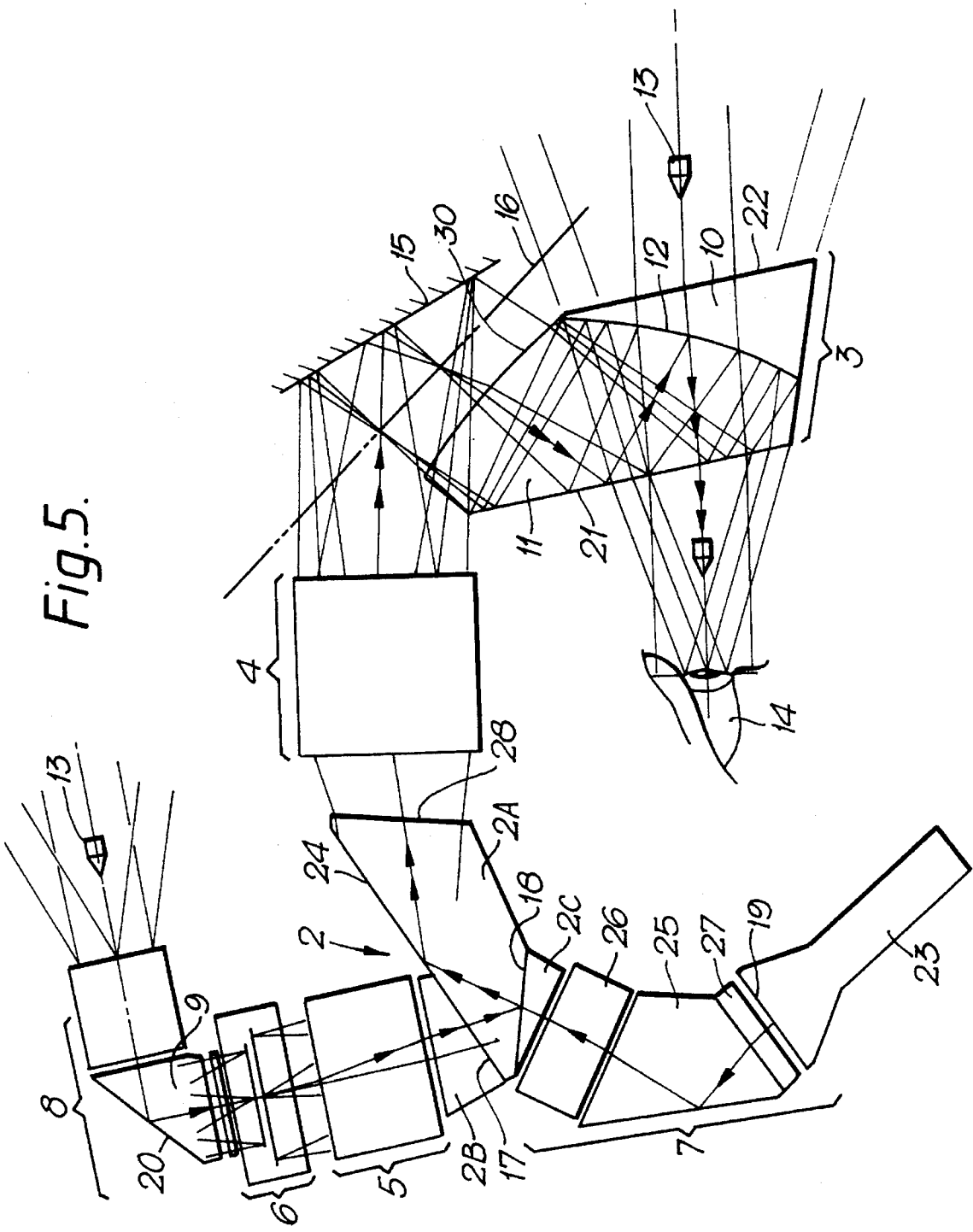
FIG. 5 is an optical schematic view of the system showing the arrangements of the lenses and prisms and indicating the light path therein.

Referring now to the drawings, conformity of the display system to the general helmet profile 29 (FIG. 2) is achieved by a number of reflections internally of the system to steer the optical path in the desired directions. The number and angular relationship of the reflections are critical to ensure than an intensified image of a night scene forward of the user, as viewed by an objective lens 1, is synchronised with a user's direct view of the scene through an eyepiece 3. The opto-mechanical arrangement to achieve this orientation synchronisation is arranged to provide an even number of reflections, six, which have sufficient separation and size to accommodate a lens system necessary to achieve optical performance. The enabling component is a 2-reflection prism means 2 shown schematically in FIG. 5, hereinafter referred to as the de-rotation prism.

Compound reflections between the input and exit surfaces 17 and 18 of a main portion 2A of the de-rotation prism 2 provide the necessary compensating image rotation to ensure that the intensified forward scene image regarded by the user is in the same orientation as the directly viewed scene through the eyepiece 3. The reflection surface 18 of the de-rotation prism 2 is optically coated so as to be partially reflective, thus allowing an introduction of additional display information into the intensified forward scene image display channel.

Selection of the position and size of the de-rotation prism 2 allows sufficient separation and a clear optical diameter for the eyepiece 3, a main relay lens group 4, an intensified image relay group 5, an image intensifier 6 and an additional display information channel 7, keeping within the physical constraints of the 3-dimensional system. An objective lens group 8 of which the objective lens 1 constitutes the first element couples to the input of the image intensifier 6 and completes the 3-dimensional optical system.

On-axis spherical lenses (not shown) constitute the active optical elements within the objective lens assembly 8. These lenses are grouped into two areas, one before and one after a fold prism 9. This prism 9 causes the optical path to turn through approximately 90°, the folding reflection being made by surface 20.

A bright display of the forward night scene, provided by the image intensifier 6, is viewed by the user via the combination of the eyepiece 3, the relay lens groups 4 and 5 and the de-rotation prism 2, light exiting the lens group 4 being directed into the eyepiece 3 by a folding reflection at a mirror surface 15.

The eyepiece 3 comprises two plastic prismatic elements 10 and 11 which mate at a common off-axis spherical surface 12. The off-axis surface 12 has a partially reflective coating to allow the user to view the forward outside world scene 13 through parallel planar aft and fore external faces 21, 22 and internal surface 12 of the eyepiece 3, and the images generated by either or both the image intensifier 6 and the additional display channel 7 by reflection at surface 12. The surface 12 is concavely curved towards the aft external face 21 so that the images viewed by the user are collimated.

The functions of the eyepiece 3 and other elements of the system will now be described, as in conventional, working from a user's eye 14 back to the display sources.

From the user's eye 14 light is reflected back from the off-axis spherical surface 12 to the aft surface 21 of the rear prism 11 of the eyepiece 3. This surface 21 is arranged at a sufficiently shallow angle to ensure the light is again reflected by total internal reflection (TIR) through an input face 30 of the prism 11 of the eyepiece 3 to the planar mirror surface 15. An intermediate image plane 16 of distorted nature is formed before the mirror 15; the distortion being a result of the off-axis spherical reflection at surface 12.

Light couple between the intermediate image plane 16 and the two display sources 6 and 7 is achieved by the relay lens group 4 and the de-rotation prism 2. The relay group 4 serves partially to correct the eyepiece abberations. Light then passes to the de-rotation prism 2 via exit face 28 and meets a surface 24 of portion 2A of the prism 2 at a shallow angle to cause a reflection by TIR towards the partially reflective surface 18, the surface 24 being coplanar with surface 17 in the embodiment described. At the surface 18 the two displays are combined according to the ratio of reflection to transmission. Depending on which display is considered, the final eyepiece intermediate image correction is achieved by lens group 5 or in additional display channel 7, the relayed image planes being formed at the image intensifier 6 or at additional display source 19, illustrated in FIG. 5 as the screen of a cathode ray tube 23. Surfaces 17 and 18 are coupled to lens groups 5 and 7 via respective wedge portions 2B and 2C of de-rotation prism 2, the input faces of wedge portions 2B and 2C being parallel to the output faces of lens group 5 and channel 7 respectively. In addition to cathode ray tube 23, the channel 7 includes a pathfolding prism 25 and lens groups 26 and 27 on either side of prism 25.

It will be appreciated that the user at 14 is able to see not only the scene ahead 13 but also to have it intensified by the image intensifier 6, which is particularly useful for night time vision. In addition to this the additional display source 19 enables further information simultaneously to be fed through the de-rotation prism 2 so that it can be viewed together with the night scene so as to further inform the user.

Figure 1:
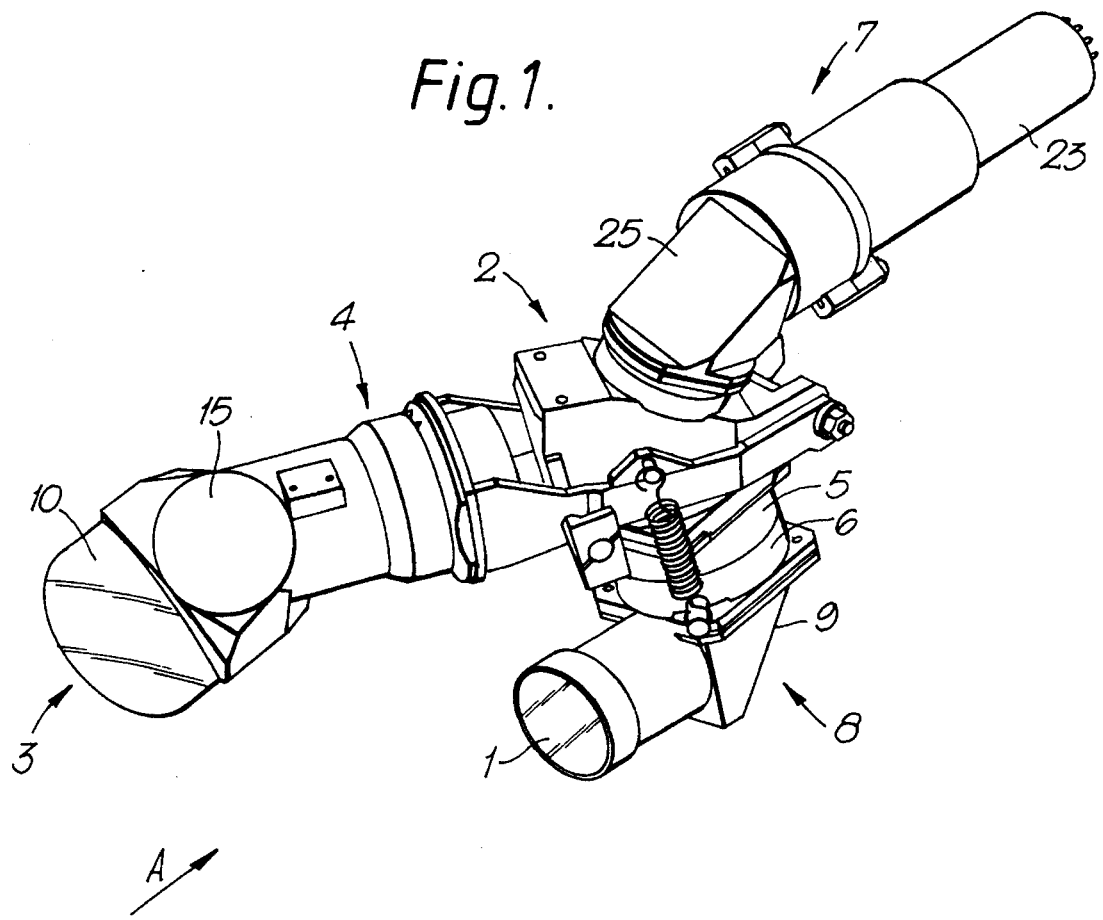
FIG. 1 is a side view of the system.
Figure 3:
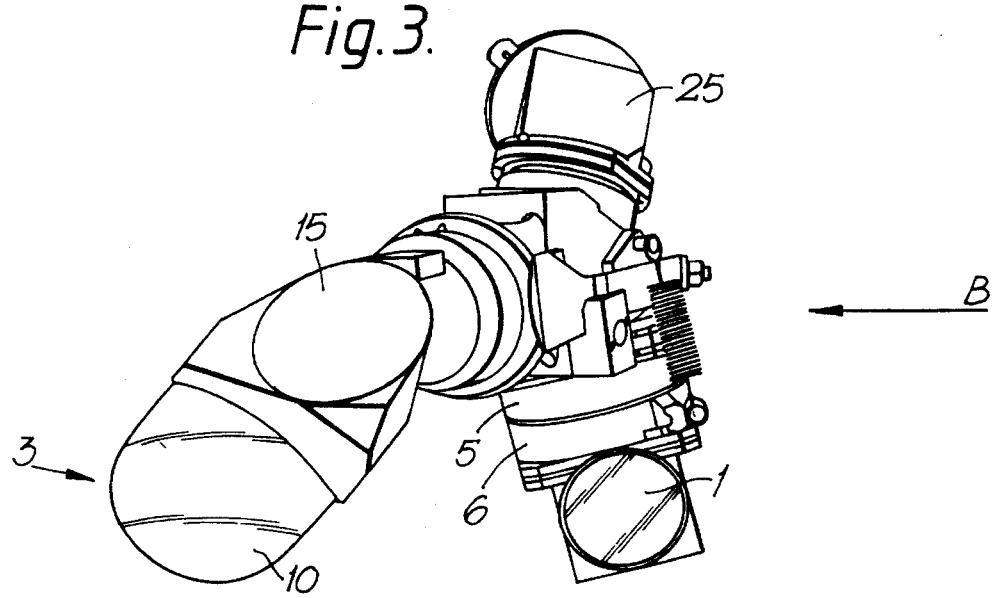
FIG. 3 is a view of the system in the direction of the arrow A of FIG. 1.
Figure 2:
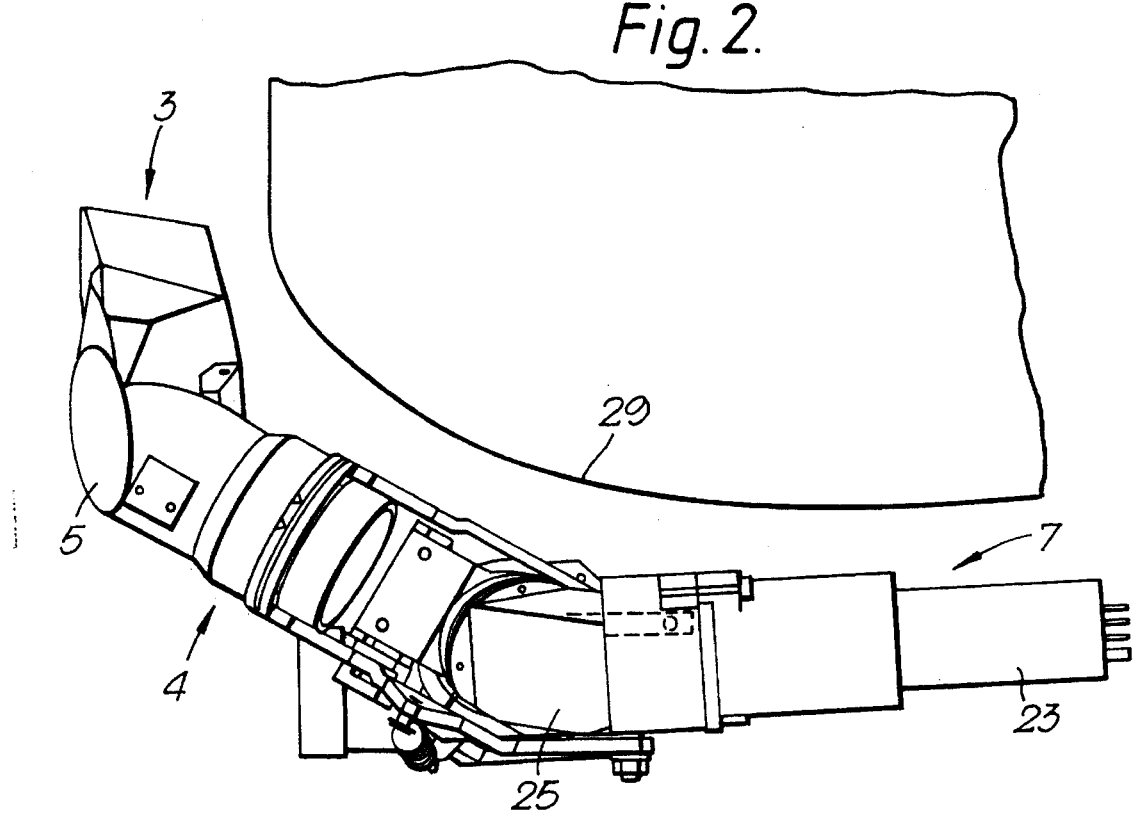
FIG. 2 is a top view of the system.
Figure 4:
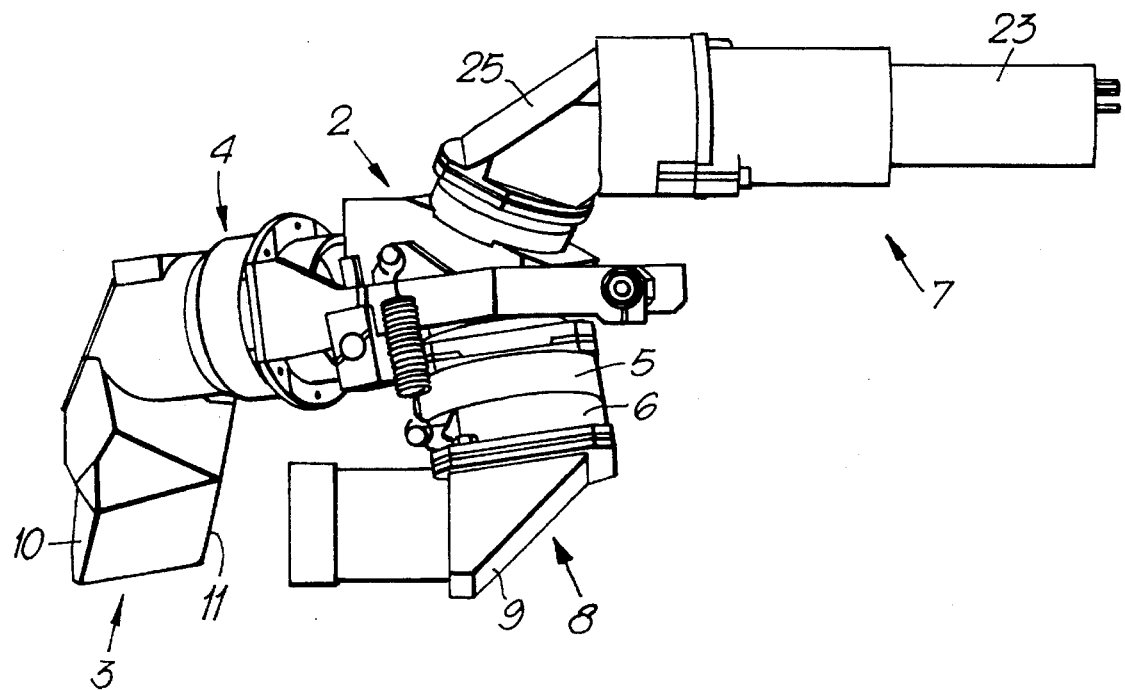
FIG. 4 is a view of the system in the direction of the arrow B in FIG. 3.

The complex faceted prism means 2 between image intensifier 6 and eyepiece 3 provides compensating image rotation with high transmission efficiency, short optical path length and a large clear diameter together with the ability to combine displays. The system is able to be mounted on a helmet so as to conform to the profile of the helmet as shown in FIG. 2.

I claim:

1. A helmet mounted display system comprising: an eyepiece through which a wearer of a helmet on which the system is mounted directly views a forward scene, said eyepiece also being operative for combining an intensified image of the forward scene with the wearer's direct view of said forward scene, said intensified image being produced by an optical arrangement operative for providing a light path substantially conforming to a profile of the helmet; and prism means in the light path and separated from said eyepiece, and operative for compensating for orientation of the intensified image in other parts of the optical arrangement, so that the intensified image of said forward scene, as viewed by the wearer, is in the same orientation as the wearer's direct view of said forward scene, said prism means including first, second, third and fourth faces, light representing the intensified image passing through said first face to be incident on said second face at which said light is reflected towards said third face at which said light is internally reflected to be directed towards said fourth face via which said light exits the prism means, said second and third faces being the only faces at which reflection occurs in said prism means, and said prism means including a wedge portion adjacent said first face via which said light representing said intensified image passes to said first face.

2. A helmet mounted display system comprising: an eyepiece through which a wearer of a helmet on which the system is mounted directly views a forward scene, said eyepiece also being operative for combining an intensified image of the forward scene with the wearer's direct view of said forward scene, said intensified image being produced by an optical arrangement operative for providing a light path substantially conforming to a profile of the helmet; and prism means in the light path and separated from said eyepiece, and operative for compensating for orientation of the intensified image in other parts of the optical arrangement, so that the intensified image of said forward scene, as viewed by the wearer, is in the same orientation as the wearer's direct view of said forward scene, said prism means including first, second, third and fourth faces, light representing the intensified image passing through said first face to be incident on said second face at which said light is reflected towards said third face at which said light is internally reflected to be directed towards said fourth face via which said light exits the prism means, said second and third faces being the only faces at which reflection occurs in said prism means; and said light representing said intensified image passing to said eyepiece from said fourth face via a further lens group and a reflecting mirror surface.

3. A helmet mounted display system comprising: an eyepiece through which a wearer of a helmet on which the system is mounted directly views a forward scene, said eyepiece also being operative for combining an intensified image of the forward scene with the wearer's direct view of said forward scene, said intensified image being produced by an optical arrangement operative for providing a light path substantially conforming to a profide of the helmet; and prism means in the light path and separated from said eyepiece, and operative for compensating for orientation of the intensified image in other parts of the optical arrangement, so that the intensified image of said forward scene, as viewed by the wearer, is in the same orientation as the wearer's direct view of said forward scene, said prism means including first, second, third and fourth faces, light representing the intensified image passing through said first face to be incident on said second face at which said light is reflected towards said third face at which said light is internally reflected to be directed towards said fourth face via which said light exits the prism means, said second and third faces being the only faces at which reflection occurs in said prism means; and said second face being partially reflective and the system further including means for introducing light representing a further display into the prism means via said second face for combination with said light representing the intensified image.

4. A system according to claim 3 wherein said prism means includes a wedge portion adjacent said second face via which said light representing said further display passes to said second face.

5. A system according to claim 3 wherein said light representing said further display passes to said prism means via a further prism means to provide a desired turn in the optical path between a source of said light representing said further display and said second face.

6. A system according to claim 5 including further lenses on either side of said further prism means.

* * * * *